United States Patent Office 3,454,526
Patented July 8, 1969

3,454,526
METHOD FOR SOLUTION SPINNING POLYCARBONATE FILAMENTS
Wolfgang Rellensmann, Bela von Falkai, and Alfred Riechle, Dormagen, and Hermann Schnell, Krefeld-Urdingen, Germany, assignors to Farbenfabriken Bayer Aktiengesellschaft, Leverkusen, Germany, a corporation of Germany
No Drawing. Filed Nov. 22, 1965, Ser. No. 509,204
Claims priority, application Germany, Dec. 10, 1964, F 44,661, F 44,662
Int. Cl. D01f *7/04, 7/06*
U.S. Cl. 260—47                    9 Claims

ABSTRACT OF THE DISCLOSURE

Filaments of linear polycarbonate having a molecular weight of from 50,000 to 95,000 wherein the stretched filaments have an X-ray interference width of not more than 1.5° and a crystallite melting point above 260° C. prepared by the steps of
(1) incorporating into a solution of a linear high molecular weight polycarbonate in an organic slovent at least one weak solvent for polycarbonate having a cohesion energy density of $\sqrt{e}$ of from 8 to 10 and a boiling point of from +60 to 180° C.,
(2) heating the resulting gelled polycarbonate solution to a temperature of from 70 to 150° C.,
(3) spinning the solution into filaments, and
(4) stretching the filaments thereby produced in a ratio of from 1:2 to 1:8.

---

The invention relates to polycarbonate filaments having improved properties and to a process for the production of filaments from polycarbonates of high molecular weight by spinning the polycarbonates from solutions which contain special nonsolvents or weak solvents for the polycarbonate.

It is known that linear polycarbonates of high molecular weight and based on bisphenols are capable of being formed into filaments, films, foils and similar structures from the melt or from the methylene chloride solution which is generally employed. Apart from a number of very valuable properties, and particularly good light stability, excellent electrical insulation power and low inflammability, these structures have a resistance to solvents which is insufficient for many purposes of use, because of their too small crystalline fraction of <5%. The too small crystalline fraction is found to be particularly disadvantageous in connection with filaments and fibres, this being apparent from a very strong lack of uniformity in the count amounting to ±25% in the stretched filamentary structures.

It is also known that filaments or fibres, or foils or films, consisting of linear polycarbonates of high molecular weight based on bisphenols having an increased crystalline fraction and, connected therewith, an improved resistance to solvents and improved uniformity, can be produced by admixing certain nonsolvents or poor solvents with the solutions in methylene chloride before the shaping thereof. According to an earlier proposal of the applicants, suitable nonsolvents or poor solvents are monohydroxyl, dihydroxyl and/or higher polyhydroxyl compounds of their esters and/or ethers, esters of phosphorous acid and also alkyl, alkylene and/or aryl carbonates.

These nonsolvents or weak solvents are used in quantities of from 10 to 100% and advantageously 25 to 50%, based on the polycarbonate.

Apart from their action in promoting crystallization in linear polycarbonates of high molecular weight, some of the aforesaid compounds do however also have disadvantages. For example, when using the very effective polyhydroxyl compounds in the formation of filaments by the known process of dry spinning, a comparatively high residual content of the said polyhydroxyl compounds is left in the filaments, and this content, due to its plasticizer effect, causes an uncontrolled subsequent crystallization and in addition generally has a disadvantageous effect on the technological properties, such as tensile strength and elongation at break, as well as temperature resistance, as a consequence of a depression of the crystallite melting point. For the production of crystalline polycarbonate filaments by the dry spinning process, the esters of phosphorous acid are only suitable to a limited extent, because decomposition phenomena at the necessary spinning temperatures. In addition, many nonsolvents or poor solvents which per se are suitable are limited in their suitability for use because of their easy combustibility or inflammability.

It is an object of this invention to provide filaments from linear polycarbonates having a molecular weight of between 50,000 to 95,000, wherein the stretched elements have an X-ray interference width of not more than 1.5° C. and a crystallite melting point not below 260° C. A further object of this invention is a process for the production of these filaments from polycarbonate of high molecular weight having a good crystallinity and improved technological properties, in which process a solution of a linear polycarbonate of high molecular weight in an organic solvent having a content of at most 25% by weight of polycarbonate is adjusted by addition of a weak solvent or the mixture thereof—optionally with exchange of the solvent—to a solution concentration of 14 to 35% by weight of linear polycarbonate of high molecular weight, the weak solvents used being those having cohesion energy density $\sqrt{e}$ values of between 8 and 10 and boiling points between +60° and 180° C., whereafter the initially gelled solutions are heated briefly to temperature between +70° and +150° C., the solutions spun to form filaments and the filaments obtained stretched in a ration of 1:2 to 1:8. The weak solvents should have the following properties under normal conditions:

(a) They must exert a gelling action on the polycarbonate solution to be used, and the gelled solution, even after standing for a relatively long time up to 500 hours, even when using relatively large quantities of the additive (e.g., 100%, based on the polymer) should not harden and must have predominantly viscous properties and consequently remain suitable for spinning.

(b) The residual content of the nonsolvent or poor solvent which is used and which remains after the filament has been formed must not have a plasticizing action on the polymer, i.e., the nonsolvent or poor solvent which is used should have only a small affinity for the element of high molecular weight in addition to its low dissolving and softening power. Such substances are particularly chlorinated aliphatic and aromatic hydrocarbons.

(c) A not too high or too low boiling point which, according to the invention, should be in the region of 60 to 180° C. and advantageously at 80 to 150° C.

(d) A low degree of inflammability.

These nonsolvents or poor solvents will have a certain value of the cohesion energy density value, which is defined as $$e = \frac{\text{intrinsic heat of evaporation}}{\text{molar volume}} = \frac{Li}{V \text{ mol}}$$

and is usually referred to in the form of $\sqrt{e}$, and for the nonsolvents or the poor solvents to be used according to the invention, $\sqrt{e}=8$ to 10. Such nonsolvents or weak solvents which satisfy the preliminary conditions as set out above include for example dichloropropane and chlorobenzene among others.

From these points of view, substances which have proved to be especially suitable poor solvents for the process according to the invention are 1,2-dichloropropane having a cohension energy density of $\sqrt{e}=8.8$ at a boiling point of 96° C. and chlorobenzene having a cohesion energy density of $\sqrt{e}=9.5$ at a boiling point of 132° C.

Spinning solutions are prepared which contain such a quantity of poor solvent that a gelled solution having viscous properties in the homogeneous phase is obtained and this solution thus remains capable of being spun. The spinning solution obtained in this way is heated for a short time at temperatures between +70 and +150° C. before being spun, so that the initially gelled solution becomes a clearly transparent true solution of the polymer. By adding this poor solvent, there is obtained in the solution a preliminary crystallization of the high polymers, which has a particularly advantageous effect on the filaments spun according to the invention because of their uniform stretchability and dyeing capacity.

As polycarbonates, there are preferably used those polycarbonates based on di(monohydroxyaryl)-alkanes, -sulphones, -sulphoxides, -sulphides or -ethers or mixture of these dihydroxy compounds with one another. The molecular weight thereof generally is between approximately 50,000 and 95,000, corresponding to a relative viscosity of $\eta_{rel}=1.48$ to 2.15 (measured in 0.5% methylene chloride at 20° C.). Molecular weights in the region of 85,000 are advantageously chosen ($\eta_{rel}=1.82$).

For carrying out the process, the polycarbonate, which frequently exists in the form of a mixture of powdered and granulated material, is dissolved in methylene chloride to form a 15 to 25% solution, advantageously 20 to 24% solution, is then filtered and, immediately before spinning, the poor solvents according to the invention are added to the solution in such a quantity that the resulting spinning concentration is 14 to 24%, advantageously 17.5 to 19.5%.

The exchange of the solvent can be so effected that a polycarbonate solution having a relatively low concentration is concentrated in a short time up to almost the concentration gelling by evaporation of the solvent at normal or slightly raised pressure and raised temperature and this concentrated solution can be admixed with a poor solvent of higher boiling point, which is an excellent solvent at high temperature, and then the solution is immediately thereafter heated to the spinning temperature.

The process of the solvent exchange for the preparation of a suitable spinning solution, such as is a prerequisite for obtaining the aforementioned crystalline polycarbonate filaments, can also be carried out by concentrating a dilute polycarbonate solution, which is already present in a mixture of a low-boiling good solvent (such as methylene chloride), and a poor solvent of higher boiling point, which acts as a good solvent at higher temperature, at high temperature with displacement of the good solvent of low boiling point and by keeping this solution at high temperature.

In addition to the wet-spinning process, the dry-spinning process is advantageously suitable for the production of filaments, the solution being spun through multiaperture spinnerets and in an inert atmosphere into a shaft heated to about 200 to 250° C. while the endless filaments freed from the solvent are drawn at a speed of 100 to 500 m./min. over roller systems and wound.

The filaments and fibres produced by the process according to the invention have, in addition to an improved crystallinity, an outstanding resistance to solvents, an excellent uniformity after stretching and a substantially improved resistance to temperature, with a higher crystallite melting point and also improved technological properties.

The following examples are only illustrative and intended to explain more specifically the object of this invention.

EXAMPLE 1

A polycarbonate having a molecular weight of 83,000, which was prepared from 2,2-di(4-hydroxyphenyl)propane by the phosgenation process, is dissolved in methylene chloride to form a 24% solution, is forced through a filter press and supplied to a mixing assembly, into which there is now also additionally injected 1,2-dichloropropane as a poor solvent, this being added in such a quantity that an 18% polycarbonate solution is obtained on leaving the mixing assembly.

The solution which has been intensively mixed with the added component is forced directly thereafter at a solution temperature of 75° C. through a multiaperture spinneret with aperture diameters of 100μ into a shaft heated to 220° C., air preheated to 110° C. being blown onto the said spinneret. The filaments are drawn off over roller systems at a speed of 180 m./min. and wound. The filaments stretched above a coagulation temperature in the ratio of 1:6.8 have the following properties:

| | |
|---|---|
| Count, den. | 50/20 |
| Strength, g./den. | 3.7 |
| Elongation at break, percent | 26 |
| Filament uniformity, percent fluctuation in size | ±2.5 |
| X-ray interference width,[1] degrees | 1.75 |
| Crystalline fraction,[2] percent | 20.5 |
| Crystallite melting point (by differential thermoanalysis), ° C. | 269 |
| Shrinkage in trichlorethylene at room temperature for 10 minutes and more, percent | 14 |

[1] The X-ray interference width or latitude serves as a standard for the crystallinity. As interference width or latitude, there is designated here the width of the main maximum of the X-ray dispersion curve of polycarbonate recorded with CuKα radiation. It is measured at half the height of the main maximum and is expressed as an angular dimension of the glossing angle (half dispersion angle) in degrees of angle. On account of the solvent residues which initially are still contained in the polycarbonate, the measurement of the interference latitude is more reliable than that of the crystalline fraction.

[2] The crystalline fraction is determined according to Hermans (Makromol. Chemie 64 (1963), pages 135 to 139).

EXAMPLE 2

The procedure of Example 1 is followed, but monochlorobenzene is injected into the mixing assembly in such a quantity that the resulting spinning solution contains 18.5% of polycarbonate. The filaments stretched above the coagulation temperature in the ratio of 1:6.8 have the following properties:

| | |
|---|---|
| Count, den. | 80/39 |
| Tensile strength, g./den. | 3.4 |
| Elongation at break, percent | 31 |
| Filament uniformity, percent fluctuation in size | ±2.2 |
| X-ray interference width, degrees | 1.05 |
| Crystalline fraction, percent | 18.8 |
| Crystallite melting point, ° C. | 265 |
| Shrinkage, percent | 14 |

EXAMPLE 3

The procedure of Example 1 is followed, but instead of the nonsolvent or poor solvent, methylene chloride is injected as solvent, so that there is obtained a pure 18% polycarbonate solution. The filaments stretched above the coagulation temperature in the ratio of 1:6.8 have the following properties:

| | |
|---|---|
| Count, den. | 50/20 |
| Tensile strength, g./den. | 3.2 |
| Elongation at break, percent | 22 |
| Filament uniformity, percent fluctuation in size | ±25 |
| X-ray interference width, degrees | 2.45 |
| Crystalline fraction, percent | 3 |

Crystallite melting point cannot be measured.
After 1 minute in trichlorethylene, decomposition.

EXAMPLE 4

The procedure of Example 1 is followed, but there is intoduced into the mixing assembly a mixture of glycol monomethylether monoacetate with methylene chloride in such a proportion and in such a quantity that the result is a 17.5% polycarbonate solution with a content of 42% of methylgylcol acetate based on polycarbonate.

The filaments obtained by stretching above the coagulation temperature in the ratio of 1:6.8 have the following properties:

| | |
|---|---|
| Count, den. | 80/39 |
| Tensile strength, g./den. | 3.15 |
| Elongation at break, percent | 27 |
| Filament uniformity, percent fluctuation in size | ±3.5 |
| X-ray interference width, degrees | 1.32 |
| Crystalline fraction, percent | 17.5 |
| Crystallite melting point, °C. | 242 |
| Shrinkage, percent | 18 |

EXAMPLE 5

A polycarbonate polycondensation mixture based on 2,2-di(4-hydroxy)propane and prepared by the phosgenation process is washed free of salt and the organic phase of the polycarbonate, dried in anhydrous form and constituting a dilute solution of 6% and with a molecular weight of 87,000 is supplied in methylene chloride to a thin-film evaporator. The rotor of the thin-film evaporator is kept at 34° C. and the jacket at 16.5° C. with an accuracy of ±0.25° C.

1,2-dichloropropane is injected in the second third of the rotor roller, into the solution thickened to the point of concentration gelling and in such a quantity that, on leaving the thin-film evaporator, an 18.2% polycarbonate solution is obtained.

The original solvent, methylene chloride, is replaced up to 85% in the spinning solution as it now exists by 1,2-dichloropropane. This solution is now heated to the spinning temperature of 85° C. and is forced through a multi-aperture spinneret having aperture diameters of 100μ into a shaft which is heated to 225° C. and in which preheated air at 115° C. is blown on to the spinneret. The filaments are drawn off over roller systems at a speed of 260 m./min. and wound. A woven article manufactured from these stretched filaments is subjected to high-temperature dyeing at 120° C. in a dyeing bath consisting of 2.6% of Resolinrot BBL (C.I. Disperse Red)
0.6% of Resolinblau RRL (C.I. Disperse Blue 72)
3.0% of Cellintonechtgelb 7G (C.I. Disperse Yellow 31, 48,000)

After dyeing, the woven article shows a uniform striation-free dyeing with the unchanged excellent technological properties of the material being used.

EXAMPLE 6

As in Example 5, a polycarbonate polycondensation solution of low concentration in methylene chloride and based on Bisphenol A, having a concentration of 5% and a molecular weight of 88,000, is supplied to a thin-film evaporator, of which the rotor roller is kept at 55° C. and the jacket thereof is kept at 16.5° C.

In the first third of the rotor roller, chlorobenzene preheated to 50° C. is injected into the solution in such a quantity that the resulting solution is an 18% polycarbonate solution. The original solvent, methylene chloride, is now replaced in the existing spinning solution in an amount up to 95% by monochlorobenzene.

Immediately after leaving the thin-film evaporator, the solution is heated to 95° C. and, at a spinning temperature of 115° C., as indicated in Example 1, it is spun into endless filaments, the shaft temperature being raised to 235° C. and the blowing air to 160° C.

The endless filaments which are obtained are stretched or drawn and subjected to high-temperature dyeing at a temperature of 120° C. and on cross-wound spools in a dyeing bath consisting of 6% Cellitonechtblau FFR (C.I. Disperse Blue 3, 61,505)
1% Cellintonechtgelb G (C.I. Disperse Yellow 3, 11,855)

A woven article produced from these dyed filaments does not show any differences in color tone while retaining unchanged excellent technological textile properties.

EXAMPLE 7

A polycarbonate solution according to Example 5 is so diluted with cholorbenzene that the resulting solvent mixture has a methylene chloride/chlorobenzene ratio of 1:2.5.

This very diluted solution is supplied to a thin-film evaporator, the rotor of which is kept at 85° C. and the jacket of which is kept at 20° C. The original solvent, methylene chloride, is 98% replaced by chlorobenzene and the concentration of the resulting solution, which is kept at 110° C., is 19.5%.

The rayon produced from this solution in a manner similar to Example 5 was stretched or drawn above the coagulation temperature in the ratio of 1:6.8 and had the following properties:

| | |
|---|---|
| Count, den. | 80/39 |
| Tensile strength, g./den. | 3.5 |
| Elongation at break, percent | 29 |
| Filament disconformity, percent fluctuation in size | ±2.3 |
| Crystalline fraction,[1] percent | 19.5 |

[1] The crystalline fraction was established according to Hermans (Makromol. Chem. 64 (1963), pages 135–139).

A woven article produced from this rayon and dyed according to Example 2 shows a uniform striation-free dyeing after the dyeing operation with unchanged good technological properties.

EXAMPLE 8 (COMPARISON EXAMPLE)

A polycarbonate solution according to Example 5 is concentrated in a manner similar to Example 1 by means of a thin-film evaporator, of which the rotor is kept at 28° C. and the jacket at 16.5° C. In the second third of the rotor roller, methylene chloride as a good solvent for polycarbonate is injected in such a quantity that, on leaving the thin-film evaporator, there is obtained an 18.5% spinning solution.

The filaments spun in a manner similar to Example 5 at a spinning temperature of 72° C. and then stretched are processed into a woven article and subjected to high-temperature dyeing at 120° C. in a dyeing bath consisting of 2.6% Resolinrot BBL (C.I. Disperse Red)
0.6% Resolinblau RRL (C.I. Disperse Blue 72)
2.0% Cellitonechtgelb 7G (C.I. Disperse Yellow 31, 48,000)

This woven article, which already had a stripy appearance before the dyeing, shows a very irregular striated dyeing after the high-temperature dyeing in the said dyeing bath, with a shrinkage of 3% in the warp and weft directions.

What we claim is:

1. A process for the production of polycarbonate filaments from a solution of a linear high molecular weight polycarbonate in an organic solvent which comprises incorporating into the solution of the polycarbonate at least one weak solvent for polycarbonate, said weak solvent having a cohesion energy density value $\sqrt{e}$ of from 8 to 10 and a boiling point of from +60° to 180° C., and being a member selected from the group consisting of dichloropropane and chlorobenzene, heating the resulting gelled polycarbonate solution containing from 14 to 35% by weight of said polycarbonate to a temperature of from 70 to 150° C., spinning said solution into filaments and stretching the filaments thereby produced in a ratio of from 1:2 to 1:8.

2. A process according to claim 1 wherein said polycarbonate, prior to incorporation of said weak solvent, is in the form of a 15 to 25% solution thereof in methylene chloride.

3. A process according to claim 1 wherein said weak solvent is dichloropropane.

4. A process according to claim 1 wherein said weak solvent is chlorobenzene.

5. A process according to claim 1 wherein following incorporation of said weak solvent the concentration of polycarbonate amounts to 14 to 24%.

6. A process according to claim 1 wherein following incorporation of said weak solvent the concentration of polycarbonate amounts to 17.5 to 19.5%.

7. A process according to claim 1 wherein said weak solvent is added to said polycarbonate solution immediately prior to the spinning of said solution.

8. Filaments consisting of linear polycarbonate having a molecular weight of from 50,000 to 95,000 wherein the stretched filaments have an X-ray interference width of not more than 1.5° and a crystallite melting point above 260° C. produced by the process of claim 1.

9. Filaments according to claim 8 wherein said linear polycarbonate has a molecular weight of about 85,000.

References Cited

UNITED STATES PATENTS

| | | | |
|---|---|---|---|
| 3,108,977 | 10/1963 | Wolff | 260—33.8 X |
| 3,185,660 | 5/1965 | Beste | 260—29.1 X |
| 3,186,961 | 6/1965 | Sears | 260—33.8 X |
| 3,254,047 | 5/1966 | Caldwell et al. | 260—33.8 X |
| 3,294,741 | 12/1966 | Schell | 260—33.8 X |
| 3,306,873 | 2/1967 | Falkai et al. | 260—33.8 X |
| 3,376,370 | 4/1968 | Koblitz et al. | |

JULIUS FROME, *Primary Examiner.*

J. H. WOO, *Assistant Examiner.*

U.S. Cl. X.R.

260—33.8; 264—184, 205